Patented Feb. 22, 1949

2,462,159

UNITED STATES PATENT OFFICE 2,462,159

CELLULOSE DERIVATIVE COMBINED WITH N-ALKOXYMETHYL POLYAMIDE

Robert L. Brown, Buffalo, N. Y., assignor to E. I. du Pont de Nemours & Company, Wilmington, Del., a corporation of Delaware No Drawing. Application June 6, 1944, Serial No. 539,038

22 Claims. (Cl. 260—15)

This invention relates to polymeric combinations, and more particularly it relates to products comprised of an N-alkoxymethyl polyamide combined with one or more organic cellulose derivatives. The invention also relates to new and improved processes for combining N-alkoxymethyl polyamide with one or more organic cellulose derivatives to form polymeric products having a greater stability and homogeneity than mere mixtures of such polymers in common solvents.

The copending patent application of Theodore L. Cairns, Serial No. 445,635, filed June 3, 1942, now abandoned, describes and claims a new class of synthetic linear polyamides of the type generally disclosed in Carothers U. S. Patents Nos. 2,071,250, 2,071,253 and 2,130,948 in which a portion of the N atoms of the polyamides have substituent alkoxymethyl groups. As disclosed in the Cairns application, these N-alkoxymethyl polyamides are obtained by reacting, in the presence of an oxygen-containing catalyst, the synthetic linear polyamides of Carothers having a hydrogen-bearing amide group with formaldehyde and an alcohol or a mercaptan to convert —NH—CO— functional groups of the polyamide to —N(CH$_2$OR)—CO— functional groups in which R is an alkyl radical. The term "N-alkoxymethyl polyamide" as used throughout the specification and claims refers specifically to these products as disclosed in greater detail in said Cairns application. The N-alkoxymethyl polyamides prepared in accordance with the process of Cairns will unavoidably contain some methylol substituent groups as well as alkoxymethyl substituent groups.

The N-alkoxymethyl polyamides as produced by the process of Cairns can be readily dissolved in numerous commonly used organic solvents, for example, methanol, ethanol, water-ethanol mixtures, acetone-methanol mixtures and the like. It has been proposed, heretofore, to modify organic cellulose derivatives, for example cellulose acetate, cellulose proprionate, cellulose acetate-butyrate or the like, which materials are also soluble in commonly used organic solvents, by forming solutions of an organic cellulose derivative and an N-alkoxymethyl polyamide in an organic solvent which will dissolve both of these materials, and forming filamentous or pellicular structures or other articles from such solutions. Although very valuable polymeric combinations have been produced in this manner, it was found that such solutions frequently were unstable in that the viscosity thereof would change within substantially short periods of time. Furthermore, such combination solutions were usually found to be cloudy, and products produced from such solutions were not clearly transparent, but were translucent or hazy.

It is an object of this invention to provide processes for forming solutions and products comprising combinations of an N-alkoxymethyl polyamide with one or more organic cellulose derivatives, which solutions will be stable and homogeneous and products resulting from such solutions will be clear and transparent.

It is another object of this invention to provide a method for the production of stable, homogeneous solutions of an N-alkoxymethyl polyamide and one or more organic cellulose derivatives which may be used in the formation of clear transparent products for example films, filaments, tubes, ribbons and the like, which products are insoluble in many commonly used organic solvents, including solvents used in the preparation of said solutions.

Other objects of the invention will appear hereinafter.

It has now been found that stable homogeneous solutions and clear, transparent products composed of an N-alkoxymethyl polyamide and an organic cellulose derivative can be formed by dissolving a synethetic linear polyamide of the type disclosed in the above-mentioned Carothers patents and one or more organic cellulose derivatives in a solvent which will dissolve both of these materials, and then reacting the synthetic linear polyamide with formaldehyde and an alcohol or a mercaptan, in the presence of an acidic substance as a catalyst for the reaction, to convert —NH—CO— functional groups of the polyamide to —N(CH$_2$AR)—CO— functional groups in which R is an alkyl radical and A is oxygen or sulfur. As a catalyst, I prefer an acid having an ionization constant between $1 \times 10^{-2}$ and $1 \times 10^{-5}$. The resulting solution may be formed into filaments, films or other structures which are clear and transparent. If desired, the combined polymeric product composed of N-alkoxymethyl polyamide and organic cellulose derivative may be precipitated from the solution in which it is formed, washed, dried and redissolved in a solvent therefor, and then formed into the desired structures or articles. The latter may be insolubilized by heating the same, preferably in the presence of an acid catalyst as hereinafter set forth.

In carrying out the process of this invention, any synthetic linear polyamide having a hydrogen-bearing amide group of the type referred to in the above-mentioned Carothers patents may be used. Such polyamides can be obtained, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants.

The preferred synthetic linear polyamides, for use in the present invention are the interpolyamides disclosed in the U. S. patents to Carothers Nos. 2,252,554 and 2,252,555 and the U. S. patent to Brubaker No. 2,285,009. These patents include: (1) synthetic linear interpolymer obtained by polymerizing a mixture comprising at least two diamines of formulae $NH_2CH_2RCH_2NH_2$ and at least two dicarboxylic acids of formula $HOOCCH_2R'CH_2COOH$ in which R and R' are divalent hydrocarbon radicles and in which R has a chain length of at least two carbon atoms, (2) a synthetic linear interpolymer obtained by polymerizing bifunctional reactants comprising at least one diamine having at least one hydrogen attached to each amino nitrogen atom, at least one polymerizable monoaminomonocarboxylic acid and at least one dibasic carboxylic acid and (3) a synthetic linear interpolymer obtained by polymerizing a mixture of at least 3 reactants taken from the group consisting of 6-aminocaproic acid, hexamethylenediammonium sebacate, hexamethylenediammonium adipate, and a mixture of hexamethylenediammonium suberate and hexamethylenediammonium azelate.

The invention applies to any organic cellulose derivative which may be dissolved together with the above said synthetic linear polyamides, in a common solvent, or solvents, therefor.

As examples of organic cellulose derivatives which may be combined with a polyamide in accordance with this invention, the following may be named:

*Cellulose esters*

Cellulose acetate
Cellulose formate
Cellulose propionate
Cellulose butyrate
Cellulose acetate-butyrate
Cellulose nitrate
Cellulose acetate-nitrate
Cellulose acetate-propionate
Cellulose glycolate

*Cellulose ethers*

Ethyl cellulose
Benzyl cellulose
Butyl cellulose

Preferably, the cellulose derivative used should have free hydroxyl groups so that the resultant product can be insolubilized. The insolubilization appears to involve a cross-linking between hydroxyls of the cellulose derivative and the alkoxymethyl groups of the N-alkoxymethyl polyamide. If desired, the organic cellulose derivative may be produced just prior to the addition of the polyamide or the polyamide reactants used to form the N-alkoxymethyl polyamide. For example, cellulose acetate may be produced in the usual way by reacting cellulose with acetic anhydride and glacial acetic acid in the presence of sulfuric acid. After the desired cellulose acetate is formed, the acetylation reaction is halted by the addition of sodium acetate and the polyamide, formaldehyde and alcohol, or mercaptan, added to form, in the solution of cellulose acetate the N-alkoxymethyl polyamide.

In some instances, it may be preferred, or necessary, to dissolve the organic cellulose derivative and the polyamide in separate solvents, and then add the solutions together. In such case, the two solutions should be miscible with each other. For example, if polyhexamethylene adipamide is to be combined with cellulose acetate, the latter is preferably dissolved in glacial acetic acid and the former in formic acid, and the two solutions added together.

In dissolving the polyamide and organic cellulose derivative any solvent or mixture of solvents may be used which will form a homogeneous solution with the two materials. For example, the solvent may be acetic acid, formic acid, acetone, methanol, ethanol, chloroform, methylene chloride, dioxane, dimethyl formamide, and mixtures of such solvents. The solvent used will depend upon the cellulose derivative or polyamide used, and also on the proportions of these materials used. The preferred solvent is glacial acetic acid since it will dissolve most of the organic cellulose derivatives listed above and will also either dissolve the polyamide or will be miscible with the solvent used for solution of the polyamide. Furthermore, acetic acid is a good reaction medium since it functions not only as a solvent for the components but also functions as a catalyst for the reaction converting the polyamide to N-alkoxymethyl polyamide. In the event that a non-acidic solvent is used in dissolving the polyamide and cellulose derivative, an acidic catalyst must be added to the solution before the N-alkoxymethyl polyamide can be formed.

As above stated, in order to form the N-alkoxymethyl polyamide, the solution must also contain formaldehyde (including a formaldehyde liberating substance) and a formaldehyde-reaction material such as an alcohol or a mercaptan. The details relative to formation of the N-alkoxymethyl polyamide are clearly stated in the above-mentioned application of Cairns. For example, alcohols having less than eight carbon atoms constitute the preferred formaldehyde-reactive organic compound, including among others, methanol, ethanol, propanol, butanol, isobutanol, dimethyl carbinol, ethylene glycol, etc. Since alcohols are the preferred formaldehyde-reactive compounds, specific reference is repeatedly made throughout the specification to N-alkoxy methyl polyamide, it being understood, however, that N-alkyl-thio-methyl polyamide may be formed in a similar manner by the use of a mercaptan as the formaldehyde-reactive material. As examples of mercaptans are mentioned ethyl mercaptan, butyl mercaptan, ethanedithiol, 1-thiosorbitol, allyl mercaptan, and mercaptoacetic acid.

The relative concentrations of reagents used in the process of this invention can be varied over wide limits. Small amounts of formaldehyde (for example, 5% by weight based on the polyamide) are operable and produce a definite change in the properties of the polyamide. When it is desired to convert an alcohol-insoluble polyamide into an alcohol-soluble product, the formaldehyde is preferably about 50 to 100% of the weight of the polyamide. Since the presence of a large excess of formaldehyde is not detrimental, there is no upper limit to operable concentrations of formaldehyde. This applies also to the amounts of alcohol used. For optimum operating conditions the molar ratio of alcohol to formaldehyde is at least one mole alcohol per mole of formaldehyde, and is preferably about two moles alcohol for one mole formaldehyde. The amount of solvent used may also be varied within wide limits; however, it is preferable to use only that amount which will dissolve the polyamide and cellulose derivative since any larger amount will not generally have any utility.

The reaction to form the N-alkoxymethyl polyamide may be carried out over a wide temperature range. The reaction temperature may be as low as 0° C., and the upper temperature is limited only by the stability of the polyamide and cellulose derivative. Preferably, the reaction temperature should be between 50° C. and 80° C., or higher (up to 125° C.), if a stirring autoclave is used. The reaction time may also be varied between wide limits depending upon the reactants, the product desired, etc. The minimum reaction time is readily evidenced by the formation of a clear solution, whereas the maximum reaction time is evidenced by a gelling of the solution.

The relative amounts of the organic cellulose derivative and polyamide which may be dissolved to form a homogeneous solution are largely dependent upon the particular cellulose derivative, the particular polyamide, and the particular solvent used. The invention has greatest utility in modifying cellulose derivatives by combining a polyamide therewith, rather than modifying a polyamide by combining therewith a cellulose derivative. Therefore, it will generally be preferred to use a predominance of the cellulose derivative and a minor amount, for example, between 0.1% and 40%, of polyamide, (based on the weight of the cellulose derivative). In certain combinations, it may even be necessary to use less than 40% polyamide in order to obtain a clear and homogeneous product. For example, when combining cellulose acetate having between 44 and 44.5% combined acetic acid with the interpolyamide consisting of 30% polyhexamethylene adipamide and 70% polyhexamethylene sebacamide, the cellulose acetate will be compatible with no more than one-third its weight (75/25) of the interpolyamide. If the cellulose acetate used has 54%–55% combined acetic acid, it will form an homogeneous, clear solution with 30% of the total weight (70/30) of the same interpolyamide.

After formation of the solution containing, combined therein, an organic cellulose derivative and a N-alkoxymethyl, or N-alkyl-thio-methyl, derivative of a polyamide, hereinafter specifically referred to as N-alkoxymethyl polyamide, or N-alkyl-thio-methyl polyamide, the solution may be cast on a smooth rigid surface, and the solvent evaporated therefrom, to form a film, or extruded through a spinneret into a coagulating medium to form a filamentous structure in a known manner. As well known in the yarn spinning art, the coagulating medium may be a liquid which is inert to the cellulose derivative and the N-alkoxymethyl polyamide but will form a solution with the solvent, or it may be a gaseous medium which will evaporate the solvent from the solution.

Where the cellulose derivative-polyamide solution is made with a cellulose derivative containing free hydroxyl groups, as is usually the case, the resultant product may be insolubilized by heating the same. If the solution does not contain an acid catalyst the insolubilization will take place by heating for a period of 2–3 hours at a temperature of 125° C. to 135° C. The insolubilization temperature and time can be considerably reduced by the addition of an acid catalyst to the solution or to the formed product. As an acid catalyst, an acid having an ionization constant between $1 \times 10^{-2}$ and $1 \times 10^{-5}$ may be used to good advantage. As examples of such acid catalysts, the following may be named:

| Acid | Ionization constant |
|---|---|
| Chloracetic acid | $1.55 \times 10^{-3}$ |
| α Chlorpropionic acid | $1.47 \times 10^{-3}$ |
| Citric acid | $8 \times 10^{-4}$ |
| Dichloracetic acid | $5 \times 10^{-2}$ |
| Formic acid | $2.1 \times 10^{-4}$ |
| Fumaric acid | $1 \times 10^{-3}$ |
| Lactic acid | $1.38 \times 10^{-4}$ |
| Maleic acid | $1.5 \times 10^{-2}$ |
| Malic acid | $4 \times 10^{-4}$ |
| Phosphoric acid | $1.1 \times 10^{-2}$ |
| Phthalic acid | $1.26 \times 10^{-3}$ |
| Salicylic acid | $1.06 \times 10^{-3}$ |
| Tartaric acid | $1.1 \times 10^{-3}$ |

For example, where a quantity of maleic acid equal to 0.3% of the dry weight of combined cellulose derivative, and polyamide is added to the solution or the product, a baking time of ½ to 1 hour at 80° C. was sufficient to render the product insoluble in solvents for the untreated product. Where the formed products are to be first treated with the catalyst, the latter can be applied from an aqueous solution thereof; the water apparently enhancing the insolubilization action.

As an alternative procedure, the combined cellulose derivative and polyamide may be precipitated from the solution thereof, for example, by means of water, or a solution of water and acetic acid. The resultant flake is washed with water and dried. The dried flake is then dissolved in a solvent therefor, for example, chloroform, chloroform-methanol, dioxane-methanol, nitromethane, nitromethane - methanol, methylene chloride, methylene chloride-methanol, methyl cellosolve-methanol, diacetone or dimethylformamide, to which may also be added an acid catalyst, i. e., an acid having an ionization constant between $1 \times 10^{-2}$ and $1 \times 10^{-5}$. The resultant solution can then be formed into the desired articles or structures, the solvent removed, and the product baked in the manner above referred to to form and insolubilize the same.

If desired, the products comprising a cellulose derivative and a N-alkoxymethyl polyamide may be treated with a material which will remove the organic substitution radicle from the cellulose derivative by saponification or hydrolysis. This may be done before or after insolubilization of the products. For example, a product containing cellulose acetate and N-alkoxymethyl polyamide may be treated with an aqueous solution of ammonium acetate and ammonia, an aqueous solution of sodium acetate and sodium hydroxide, an aqueous solution of alcoholic alkali, or with a methanol-sodium methylate solution in a known manner to deacetylate the cellulose acetate.

The following examples are given to illustrate, in detail, certain preferred methods for carrying out the present invention, it being understood that the invention is not to be limited to the details set forth in these examples. Unless otherwise stated, parts and proportions are parts and proportions by weight.

*Example I*

To 200 grams of a 15% solution of cellulose acetate, (55.5%–56.0% combined acetic acid) in glacial acetic acid, at a temperature of 70° C., were added 50 grams of a 15% glacial acetic acid solution of an interpolyamide prepared by interpolymerizing 30 parts hexamethylene diammonium adipate and 70 parts hexamethylene diammonium sebacate. The mixture was stirred until distribution of the components was uniform, and then 15 grams of a 1:1 methanol:formaldehyde solution were added. Thus the ratio of components in the mixture of cellulose acetate:polyamide: methanol:formaldehyde was equal to 4:1:1:1. The reaction mixture was stirred at a temperature of 70° C. for 20 minutes at which time it cleared to a homogeneous solution. After carrying on the reaction for a further period of two hours at a temperature of 70° C., the solution was cast on a chromium plate, and the solvent removed therefrom, to give an essentially clear film. This solution was found to gel after a reaction period of five hours at 70° C.

*Example II*

To 200 grams of a 15% solution of cellulose acetate (54.0%–55.0% combined acetic acid) in glacial acetic acid, at a temperature of 70° C., were added 50 grams of a 15% glacial acetic acid solution of an interpolyamide prepared by interpolymerizing 30 parts of hexamethylene diammonium adipate and 70 parts hexamethylene diammonium sebacate. The mixture was stirred until distribution of the components was uniform, and then 15 grams of a 1:1 methanol:formaldehyde solution were added. The reaction mixture was stirred at 70° C. for a period of two hours, and the solution was then cooled to a temperature of 5° C. The cooled solution was extruded through a spinneret into an aqueous coagulating bath containing 12.5% glacial acetic acid and 13.5% ammonium acetate at a temperature of 5° C. The filaments passing from the spinneret were drawn from the coagulating bath. The filaments were composed of cellulose acetate containing a methoxymethyl derivative of the above mentioned polyamide.

*Example III*

This example is the same as Example I above, except that 12.5 grams of methyl phthalyl ethyl glycolate were added to the essential reaction mixture. The reaction mixture was stirred for one hour at 70° C., and then was cast on a chromium plate, and the solvent removed therefrom, to produce a very soft and brilliantly clear film. The glycolate contained in the film functions as a plasticizer for the cellulose acetate-polyamide structure.

*Example IV*

This example was carried out in the manner of Example I above, except that an interpolyamide prepared by interpolymerizing 40 parts hexamethylene diammonium adipate, 30 parts hexamethylene diammonium sebacate and 30 parts 6-caprolactam were substituted for the interpolyamide described in Example I. The reaction mixture was stirred at 70° C. for 60 minutes after which a clear homogeneous solution was formed. A film cast from the solution in the manner described in Example I was similar in all respects to the film obtained by the process of Example I. The solution gelled after a reaction period of four to five hours at 70° C.

*Example V*

To 200 grams of a 15% solution of cellulose acetate (44.0%–44.5% combined acetic acid) in glacial acetic acid were added, 22 grams of a 15% glacial acetic acid solution of the same interpolyamide described in Example I. To this mixture 6.6 grams of a 1:1 methanol:formaldehyde solution were added, and the mixture stirred at a temperature of 70° C. The ratio of reactants, by weight; cellulose acetate:polyamide:methanol:formaldehyde was equal to 9:1:1:1. In the first phase of the reaction, the components evidenced their incompatibility by forming a very cloudy mixture which, after about 30 minutes became brilliantly clear and homogeneous, exhibiting none of the optical properties associated with non-homogeneous systems. After 40 minutes reaction at 70° C., the solution was cast on a chromium plate and the solvent removed therefrom, to give a film of clarity far surpassing any similar film cast from a similar cellulose acetate and similar polyamide dissolved in a common solvent therefor.

The films produced in the above described example are clear and transparent, and have a greater tear resistance and dimensional stability than similar sheets made from cellulose acetate alone.

*Example VI*

To 200 grams of a 15% solution of cellulose acetate (44.5%–45.0% combined acetic acid) in glacial acetic acid were added 50 grams of a 15% solution of polyhexamethylene adipamide in 90% formic acid, and 15 grams of a 1:1 methanol:formaldehyde solution. Thus the ratio of reaction components was cellulose acetate:polyamide:methanol:formaldehyde equal to 4:1:1:1. After stirring this reaction mixture at a temperature of 70° C., for a period of 15 minutes, the mixture became brilliantly clear and homogeneous. A film cast after 25 minutes reaction, and the solvent removed therefrom, was essentially clear and transparent. The solution gelled after 30 minutes reaction.

*Example VII*

To 12.8 pounds of a 15% solution of cellulose acetate (54.0%–55.0% combined acetic acid) in glacial acetic acid, at a temperature of 70° C. were added 3.2 pounds of a hot (70°–80° C.) 15% glacial acetic acid solution of an interpolyamide prepared by interpolymerizing 30 parts hexamethylene adipamide and 70 parts hexamethylene diammonium sebacate. The mixture was then stirred at 70° C. until the distribution of components was uniform (5–15 minutes), and one pound of 1:1 methanol:formaldehyde solution added thereto. Thus the ratio of reaction components was approximately cellulose acetate:polyamide:methanol:formaldehyde equal to 4:1:1:1. The mixture was stirred at 70° C. for an additional three hours at which time it was rapidly cooled and diluted, with stirring, with 32 pounds of cold (5°–10° C.) 1:1 acetic acid-water. The diluted mixture was filtered and from it the flake precipitated by pouring slowly into a large volume of rapidly stirred water. Precipitation and final purification of the flake were facilitated by continuous removal of the acetic acid by reaction with aqueous ammonia just short of the neutral point. The flake was washed, the water expressed therefrom, and the pressed cake ground to convenient size and dried in vacuo at room temperature to yield a cellulose acetate flake containing approximately 24% methoxymethyl derivative of the above said polyamide.

The dried flake was readily soluble in chloroform-methanol (85–15 solution) and in dioxane-methanol (65-35 solution) to give clear, stable solutions from which glass-clear films may be cast. Similar films cast from similar solutions containing suitable plasticizers, for example, dibutyl phthalate, or tri-cresyl phosphate were clear, soft and of generally improved physical properties.

Solutions of the flake in dioxane-methanol (85-15 solution) and in chloroform-methanol (65-35 solution), may be dry-spun in accordance with the conventional dry-spinning processes in which the solvent is evaporated from the freshly spun yarn after it is extruded from the spinneret. The fibers, dry-spun as above referred to, were essentially insoluble in solvents for the above mentioned flake whether or not the solutions contained an acid catalyst of the type above referred to. These fibers retained their fiber form after 1/2 hours in boiling acetone.

*Example VIII*

A mixture of 140 grams of a 15% solution of cellulose acetate (54.0%-55.0% combined acetic acid) in glacial acetic acid, 60 grams of a solution of an interpolyamide described in Example I in glacial acetic acid, and 36 grams of a 1:1 methanol:formaldehyde was stirred at a temperature of 70° C. for a period of 2½ hours, and allowed to stand 18 hours at room temperature and then heated at 90° C. for 40 minutes at which time the mixture cleared to form a homogeneous solution. When diluted with 1½ times the volume of the solution of 2:1 acetic acid:water, and the solution is poured into water, the cellulose acetate and polyamide form a combined precipitate which may be washed and dried in the manner above described in Example VII. The product redissolved in 88:12 chloroform: methanol is cast on a chromium plate. After removal of the solvent, a glass-clear film is formed. The resultant film contains approximately 65% cellulose acetate and 35% methoxymethyl derivative of the above said polyamide.

*Example IX*

A cellulose acetate-hydroxymethyl polyamide composition is obtained by stirring at a temperature of 70° C., a mixture of 200 grams of a 15% glacial acetic acid solution of cellulose acetate (55.5%-56.0% combined acetic acid), 50 grams of a 15% solution of polyhexamethylene adipamide in 90% formic acid and 19 grams of formalin (37% aqueous formaldehyde). The mixture cleared to a homogeneous solution after 15 minutes stirring. A film cast from the solution after 40 minutes reaction is somewhat hazy. After two hours stirring at a temperature of 70° C., the clear solution began to increase somewhat in viscosity but did not gel upon standing for 18 hours at room temperature.

*Example X*

To 170 grams of a 15% solution of "Hercose C" (cellulose acetate-butyrate) in glacial acetic acid were added 30 grams of a 15% solution of the interpolyamide of Example I, in glacial acetic acid, and 10 grams of a 1:1 methanol:formaldehyde. The mixture was stirred at 70° C., and after 10 minutes, a second 10 gram portion of methanol:formaldehyde was added. The mixture became a brilliantly clear solution after a further reaction period of 15 minutes. Gellation had not occurred after 2.5 hours at 70° C.

*Example XI*

This example is the same as Example X, except that "Hercose AP" (cellulose acetate-propionate) was used. The mixture became a clear solution after 25 minutes and had not gelled after 2 hours at 70° C.

*Example XII*

This example was carried out similar to Example X, except that ethyl cellulose was used in place of the cellulose acetate butyrate. The mixture to a slightly cloudy homogeneous solution after 30 minutes reaction at 70° C. After one hour the solution was poured into aqueous ammonia (10% solution), and the precipitated product was washed, dried and redissolved in methanol. A film cast from the methanol solution was slightly hazy but far clearer than films cast from solution mixtures of ethyl cellulose and similar methoxymethyl polyamide.

*Example XIII*

A clear cellulose acetate-methoxymethyl polyamide film containing 24% of the latter component, such as obtained by the process of Example VII, is deacetylated by an 18 hour immersion in an aqueous bath, containing 20% ammonium acetate and 10% ammonia. The resulting film was washed with water and dried on a plate to give a brilliantly glass-clear cellulosic film containing approximately 34% of the methoxymethyl polyamide component.

By the process of the present invention, it is possible to obtain homogeneous, clear and stable solutions containing an organic cellulose derivative and an N-alkoxymethyl-, or N-alkyl-thiomethyl-polyamide. These solutions may be formed into products which also are clear and transparent. Such homogeneous and stable solutions, and clear, transparent products are not readily obtainable, if obtainable at all, by dissolving an organic cellulose derivative and an N-alkoxymethyl-, or N - alkyl - thio - methyl-polyamide in a common solvent therefor.

Films and fibers produced from the combined organic cellulose derivative and N-alkoxymethyl polyamide have superior durability characteristics than the unmodified cellulose derivatives.

Since it is obvious that many changes and modifications can be made in the details above described without departing from the nature and spirit of the invention, it is to be understood that the invention is not to be limited to the above described details except as set forth in the appended claims.

I claim:

1. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose derivative of the class consisting of cellulose esters and cellulose ethers, said cellulose derivative having free hydroxyl groups, and reacting the linear polyamide with formaldehyde and a substance of the class consisting of monomeric alcohols, and mercaptans in which the thiol groups are attached to an aliphatic carbon atom, in the presence of an acidic substance, 2. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose ester, and reacting the linear polyamide with formaldehyde and a substance of the class consisting of monomeric alcohols, and mercaptans in which the thiol groups are attached to an aliphatic carbon atom, in the presence of an acidic substance.

3. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose acetate, and reacting the linear polyamide with formaldehyde and a substance of the class consisting of monomeric alcohols, and mercaptans in which the thiol groups are attached to an aliphatic carbon atom, in the presence of an acidic substance.

4. The process which comprises dissolving in acetic acid, a cellulose acetate, a linear interpolyamide obtained by interpolymerizing hexamethylene diammonium adipate and hexamethylene diammonium sebacate, and reacting the linear interpolyamide with formaldehyde and a substance of the class consisting of monomeric alcohols, and mercaptans in which the thiol groups are attached to an aliphatic carbon atom, in the presence of an acidic substance.

5. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose derivative of the class consisting of cellulose esters and cellulose ethers, said cellulose derivative having free hydroxyl groups, and reacting the linear polyamide with formaldehyde and a substance of the class consisting of monomeric alcohols, and mercaptans in which the thiol groups are attached to an aliphatic carbon atom, in the presence of an acid having an ionization constant between $1\times10^{-2}$ and $1\times10^{-5}$, forming an article from said solution and removing the solvent therefrom.

6. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose ester, and reacting the linear polyamide with formaldehyde and a substance of the class consisting of monomeric alcohols, and mercaptans in which the thiol groups are attached to an aliphatic carbon atom, in the presence of an acid having an ionization constant between $1\times10^{-2}$ and $1\times10^{-5}$, forming an article from said solution and removing the solvent therefrom.

7. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose acetate, and reacting the linear polyamide with formaldehyde and a substance of the class consisting of monomeric alcohols, and mercaptans in which the thiol groups are attached to an aliphatic carbon atom, in the presence of an acid having an ionization constant between $1\times10^{-2}$ and $1\times10^{-5}$, forming an article from said solution and removing the solvent therefrom.

8. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose derivative of the class consisting of cellulose esters and cellulose ethers said cellulose derivative having free hydroxyl groups, and reacting the linear polyamide with formaldehyde and a substance of the class consisting of monomeric alcohols, and mercaptans in which the thiol groups are attached to an aliphatic carbon atom, in the presence of an acid having an ionization constant between $1\times10^{-2}$ and $1\times10^{-5}$, forming an article from said solution and removing the solvent therefrom and heating said article to insolubilize the same.

9. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose ester having free hydroxyl groups, and reacting the linear polyamide with formaldehyde and a substance of the class consisting of monomeric alcohols, and mercaptans in which the thiol groups are attached to an aliphatic carbon atom, in the presence of an acid having an ionization constant between $1\times10^{-2}$ and $1\times10^{-5}$, forming an article from said solution and removing the solvent therefrom and heating said article to insolubilize the same.

10. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose acetate having free hydroxyl groups, and reacting the linear polyamide with formaldehyde and a substance of the class consisting of monomeric alcohols, and mercaptans in which the thiol groups are attached to an aliphatic carbon atom, in the presence of an acid having an ionization constant between $1 \times 10^{-2}$ and $1 \times 10^{-5}$, forming an article from said solution and removing the solvent therefrom and heating said article to insolubilize the same.

11. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose derivative of the class consisting of cellulose esters and cellulose ethers said cellulose derivative having free hydroxyl groups, and reacting the linear polyamide with formaldehyde and a substance of the class consisting of monomeric alcohols, and mercaptans in which the thiol groups are attached to an aliphatic carbon atom, in the presence of an acid having an ionization constant between $1 \times 10^{-2}$ and $1 \times 10^{-5}$, mixing said solution with a liquid which will precipitate the combined polymeric material, washing said precipitate, and drying the same.

12. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose ester, and reacting the linear polyamide with formaldehyde and a substance of the class consisting of monomeric alcohols, and mercaptans in which the thiol groups are attached to an aliphatic carbon atom, in the presence of an acid having an ionization constant between $1 \times 10^{-2}$ and $1 \times 10^{-5}$, mixing said solution with a liquid which will precipitate the combined polymeric material, washing said precipitate, and drying the same.

13. The process which comprises dissolving in a common solvent therefor, a member of the class consisting of linear polyamides obtained by reacting by self-poylmerization a monoaminomonocarboxylic acid, by reacting in substantially equimolecular amounts a diamine with a dibasic carboxylic acid, by reacting in substantially equimolecular amounts of monoaminomonohydric alcohol with a dibasic carboxylic acid, and by reacting the amide-forming derivatives of said reactants; and a cellulose acetate, and reacting the linear polyamide with formaldehyde and a substance of the class consisting of monomeric alcohols, and mercaptans in which the thiol groups are attached to an aliphatic carbon atom, in the presence of an acid having an ionization constant between $1 \times 10^{-2}$ and $1 \times 10^{-5}$, mixing said solution wtih a liquid which will precipitate the combined polymeric material, washing said precipitate, and drying the same.

14. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose derivative of the class consisting of cellulose esters and cellulose ethers said cellulose derivative having free hydroxyl groups, and reacting the linear polyamide with formaldehyde and a substance of the class consisting of monomeric alcohols, and mercaptans in which the thiol groups are attached to an aliphatic carbon atom, in the presence of an acid having an ionization constant between $1 \times 10^{-2}$ and $1 \times 10^{-5}$, mixing said solution with a liquid which will precipitate the combined polymeric material washing said precipitate, drying said precipitate, dissolving said precipitate in a solvent therefor, adding an acid having an ionization constant between $1 \times 10^{-2}$ and $1 \times 10^{-5}$, forming an article from said solution and removing the solvent therefrom and heating said article to insolubilize the same.

15. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose ester having free hydroxyl groups, and reacting the linear polyamide with formaldehyde and a substance of the class constisting of monomeric alcohols, and mercaptans in which the thiol groups are attached to an aliphatic carbon atom, in the presence of an acid having an ionization constant between $1 \times 10^{-2}$ and $1 \times 10^{-5}$, mixing said solution with a liquid which will precipitate the combined polymeric material washing said precipitate, drying said precipitate, dissolving said precipitate in a solvent therefor, adding an acid having an ionization constant between $1 \times 10^{-2}$ and $1 \times 10^{-5}$, forming an article from said solution and removing the solvent therefrom and heating said article to insolubilize the same.

16. The process which comprises dissolving in a common solvent therefor, a member of the class consisting of linear polyamides obtained by reacting by self-polymerization a monoaminomonocarboxylic acid, by reacting in substantially equimolecular amounts a diamine with a dibasic carboxylic acid, by reacting in substantially equimolecular amounts a monoaminomonohydric alcohol with a dibasic carboxylic acid, and by reacting the amide-forming derivatives of said reactants; and a cellulose acetate having free hydroxyl groups, and reacting the linear polyamide with formaldehyde and a substance of the class consisting of monomeric alcohols, and mercaptans in which the thiol groups are attached to an aliphatic carbon atom, in the presence of an acid having an ionization constant between $1 \times 10^{-2}$ and $1 \times 10^{-5}$, mixing said solution with a liquid which will precipitate the combined polymeric material washing said precipitate, drying said precipitate, dissolving said precipitate in a solvent therefor, adding an acid having an ionization constant between $1 \times 10^{-2}$ and $1 \times 10^{-5}$, forming an article from said solution and removing the solvent therefrom and heating said article to insolubilize the same.

17. The process as defined in claim 14 characterized in that, subsequent to said baking step, the article is treated to remove the substitution radical from the cellulose derivative.

18. The product produced by the process of claim 1.

19. The product produced by the process of claim 2.

20. The product produced by the process of claim 3 in which said substance reacted with the linear polyamide is a monomeric alcohol.

21. The product produced by the process of claim 4 in which said substance reacted with the linear polyamide is a monomeric alcohol.

22. The product produced by the process of claim 4 in which said substance reacted with the linear polyamide is a monomeric alcohol and in which the cellulose acetate is deacetylated.

ROBERT L. BROWN.

REFERENCES CITED

The following references are of record in the file of this patent:

UNITED STATES PATENTS

| Number | Name | Date |
| --- | --- | --- |
| 2,412,993 | Larchar | Dec. 24, 1946 |